July 15, 1958 C. A. WILKINS ET AL 2,843,671

FEED BACK AMPLIFIERS

Filed May 19, 1954 2 Sheets-Sheet 1

INVENTORS
CHARLES A. WILKINS
& HERBERT W. SULLIVAN
BY
Theodore Haynes
ATTORNEY

INVENTOR.
CHARLES A. WILKINS
HERBERT W. SULLIVAN
BY Theodore Hafner
ATTORNEY 2,843,671
Patented July 15, 1958

2,843,671

FEED BACK AMPLIFIERS

Charles A. Wilkins and Herbert W. Sullivan, New York, N. Y., assignors to David Bogen & Company, Inc., a corporation of New York Application May 19, 1954, Serial No. 430,816

2 Claims. (Cl. 179—1)

This invention relates to feed back amplifiers especially audio frequency amplifiers and more particularly to amplifiers operating loudspeakers or similar translating devices.

One of the objects of the invention is to control the frequency response of an electric or electronic translating device by adjusting the output impedance that feeds the translating device.

Another object of the invention is more linear sound amplitude vs. frequency response from loudspeaker and its enclosure.

Another object of the invention is reduction of distortion generated by the loudspeaker, and an increase in loudspeaker efficiency.

A specific object of the invention is to control the frequency response of a loudspeaker and especially its characteristic resonance, by adjusting, reducing or increasing the damping factor of the output circuit, depending upon the desired effect on frequency response characteristic of the loudspeaker.

A further object of the invention is to connect the output circuit of an audio frequency amplifier which controls a loudspeaker, to its input circuit over several separate feed-back circuits, a voltage feedback and a current feedback, the latter being preferably adjustable. The voltage feedback circuit derives a voltage from the load circuit that is proportional to the voltage across the load. Generally, this voltage is returned to an earlier point in the amplifier in such a manner as to be in phase opposition with the signal voltage existing at that earlier point. (This constitutes negative voltage feedback.)

The current feedback circuit derives a voltage from the load circuit that is proportional to the current through the load. This voltage is returned to an earlier point in the amplifier (which may or may not be the same point to which the voltage feedback is returned).

Still further an object of the invention is to adjust the current feedback from negative to positive current feed and between two predetermined end points or positions thereby varying the damping factor of the output circuit from a very low value, say 3, to a relatively high value of infinity and higher.

Still another object of the invention is to extend the positive current feedback up to an amount causing the output circuit to assume a negative impedance value, thereby overcoming in effect at least a portion of the loudspeaker or voice coil impedance.

Still further an object of the invention is to insert in the current feedback preferably between the adjustment means and the input circuit of the amplifier a filter for example a low frequency pass filter causing the current feedback to be relatively ineffective at the high frequency portion of the audio range.

These and other objects of the invention will be more fully understood from the drawings annexed herewith in which Fig. 1 represents a block diagram embodying certain features of the invention.

Fig. 2 shows one realization of the invention in greater detail.

Fig. 3 explains the operation of Fig. 2.

Figures 1, 2, 4, 5:
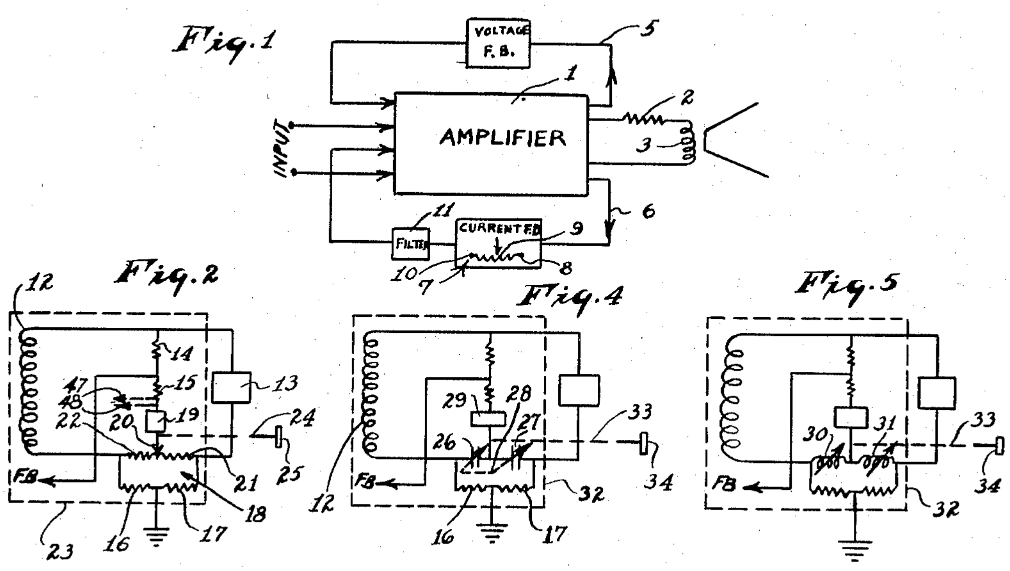
Figs. 4 and 5 show modifications of the invention.

Fig. 1, part 1 represents an audio amplifier of more or less standard construction the output of which is connected to resistance 2 representing the resistance of voice coil 3 of dynamic loudspeaker 4.

In Fig. 1 the output circuit of amplifier 1 is also connected over two separate and substantially independent current paths 5 and 6 carrying voltages proportional to voltage across the load and current through the load to appropriate points of the input circuit of amplifier 1; both paths are connected in a manner otherwise known per se as feedback circuits, with circuit 5 being designed to serve substantially as a voltage feedback circuit and circuit 6 being designed substantially to operate as a current feedback circuit.

In current feedback circuit 6 there is inserted a regulating network schematically indicated by potentiometer 7 to vary the feedback current from a predetermined negative value at one end position 8 through a zero value in center position 9 to a predetermined positive value at its other end position 10. The latter position in accordance with this invention preferably extends to a point at which the output circuit of the amplifier represents a negative resistance with respect to the loudspeaker circuit thereby permitting at least some of the resistance of the voice coil of the loudspeaker to be cancelled out thus modifying the effect of the voice coil impedance.

In Fig. 1 the effect of the current feedback is shown to be reduced or eliminated for the higher part of the audio frequency range by inserting in the path of the current feedback i. e. between feedback adjuster 7 and the input circuit (not shown) of the amplifier 1 a low pass filter 11.

Fig. 2 shows an audio amplifier system in greater detail with output 13 being derived from the secondary 12 of an output transformer not shown.

Voltage feedback is derived from a voltage divider consisting of resistors 14 and 15. Current feedback is derived from a Wheatstone bridge consisting of resistors 16, 17 and a potentiometer 18 with a ground connection taken from the junction between the resistors. The current-proportional feedback is derived from the slider of the potentiometer 18 and may be a value ranging from positive through zero to a negative value depending upon the position of the slider 20 of the potentiometer 18.

A low pass filter 19 is connected between resistor 15 and the slider of potentiometer 18 and so dimensioned as to pass the current feedback voltage at high audio frequency range to ground. This filter restricts the currrent-proportional feedback to the low frequency portion of the audio range, so that the current-proportional feedback circuit will not introduce frequency discrimination in the feedback applied to the amplifier due to any inductive effect of the load. This effect is caused by the electrical inductance of the voice coil (if the load device should be a loudspeaker). For other types of load device, the load either may not have an induction component or the frequency discriminating effect may not be of importance in performance; in either case the filter may be omitted from the circuit.

Depending upon the values of shunt resistors 16, 17 in an intermediate position 20 of the slider of potentiometer 18, the current feedback will be zero corresponding to a damping factor of say 30, that is inherent in the amplifier when only the voltage feedback circuit is effective.

In one end position 21 of the slider, there is negative current feedback corresponding to a relatively low damping factor of say 3 while in the other extreme end position 22 of the slider there is positive feedback current corresponding to a damping factor of infinity, and even higher with the result that the output impedance of the amplifier becomes negative thereby reducing if not eliminating the effect of the electrical impedance of voice coil of loudspeaker or load 13.

In Fig. 2 the enclosure of the amplifier cabinet is indicated by dotted line 23 and the slider of potentiometer 18 is so arranged as to be operated from the outside of enclosure 23, as is also schematically indicated in Fig. 2 by dotted line 24 coupling its potentiometer slider mechanically or otherwise to a rotatable knob 25 arranged outside of enclosure or cabinet 23 permitting adjustment of the damping factor and thereby a tone control or control of the damping of loudspeaker or load 13 from the outside of cabinet 23.

Figure 3:
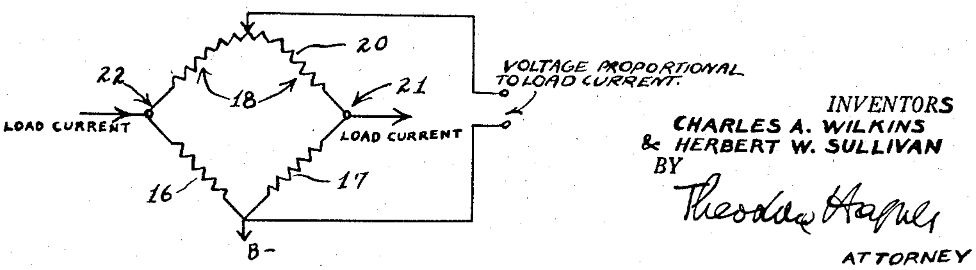

As apparent from the diagram of Fig. 3, it will be noted that the circuit of Fig. 2 composed of control 18 and the two impedances 16, 17 is a bridge circuit in configuration wherein the sections of potentiometer 18 divided by the slider represent two branches of this bridge and resistors 16, 17 the two other branches of the bridge. One pair of diagonal points serves to feed and withdraw the load current, and the two remaining diagonal points of the bridge produce the voltage proportional to the load current.

In Fig. 4 the resistance network for regulating the damping factor is replaced by a capacitance network.

There two adjustable series connected capacities 24, 25 preferably are ganged at 26.

Otherwise there are two series connected shunt resistors 27, 28 and a pass filter 29 arranged in similar manner and with similar effect as in Fig. 2.

In Fig. 5 damping adjustment occurs by means of a pair of series connected inductances 30, 31.

Resistors represented by 16, 17 of Figs. 2 through 4 may be replaced by suitable impedance networks consisting of inductances, resistors, and condensors or combinations thereof to realize an adjustable resistance, capacitance, inductance means or any combination thereof under control from the output of the amplifier. This also can be used to cancel out or modify the impedance of the loudspeaker or other load device and thus modify its electrical characteristics, without departing from the scope of the disclosure.

In Figs. 4 and 5 the current feedback line is derived from the junction point of the two regulating line elements, condensors 27, 28 in Fig. 4 and inductances 30, 31 in Fig. 5, and in both cases the control of these regulating elements is realized from the outside of the receiver cabinet indicated in Fig. 4 and Fig. 5 by dotted line 32.

The control is effected by means of a mechanical shaft or any other coupling schematically indicated in Figs. 4 and 5 by dotted line 33 and operated by a turn button or similar adjustment device 34 arranged outside of cabinet 32 to permit appropriate regulation of damping in accordance with this invention.

Figure 6:
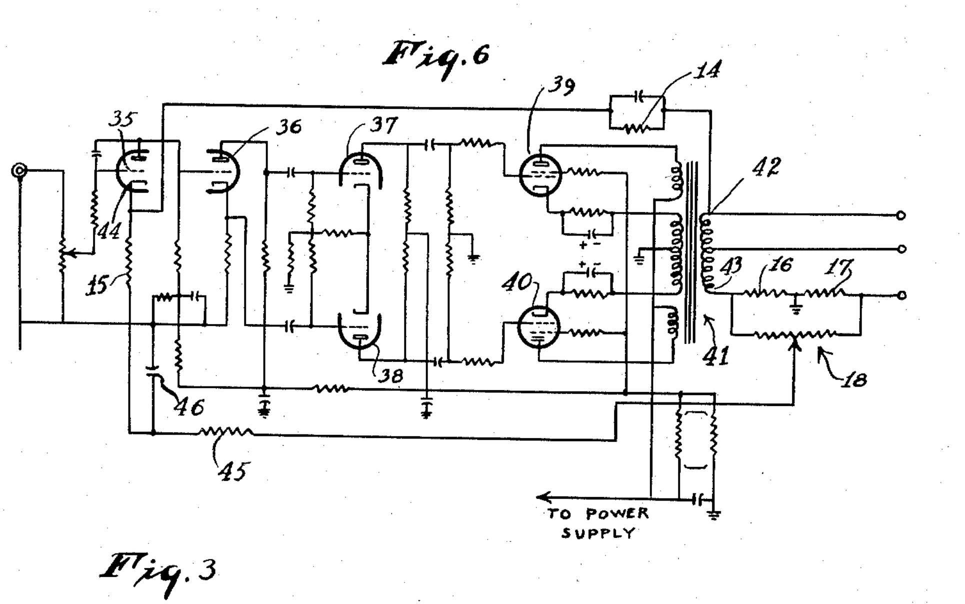
Fig. 6 shows a practical application of the invention.

Fig. 6 shows a realization of the invention in the form of an amplifier having input tube 35 driving over a number of intermediate tubes 36, 37 and 38, two push-pull connected output tubes 39, 40 coupled to transformer 41.

Voltage and current feedback circuits are derived from opposite terminals 42, 43 of transformer 41 and fed over resistors 14, 15 respectively to the cathode 44 of input tube 35.

The low pass filter includes a series connected resistor 45 and a bypass condenser 46.

Instead of feeding voltage and current feedbacks over a common line or to a common point to the input circuit as shown in Fig. 6, it is feasible to provide two separate circuits feeding back voltage and current respectively to an appropriate point of the input circuit in accordance with this invention and without departing from its scope.

In order to achieve this purpose it is only necessary for example in Fig. 2 to separate resistor 15 from filter 19 and connect resistor 15 over dotted line 47 to a predetermined potential or ground while the correct feedback is derived from filter 19 between dotted line 48 and ground.

Figure 7:
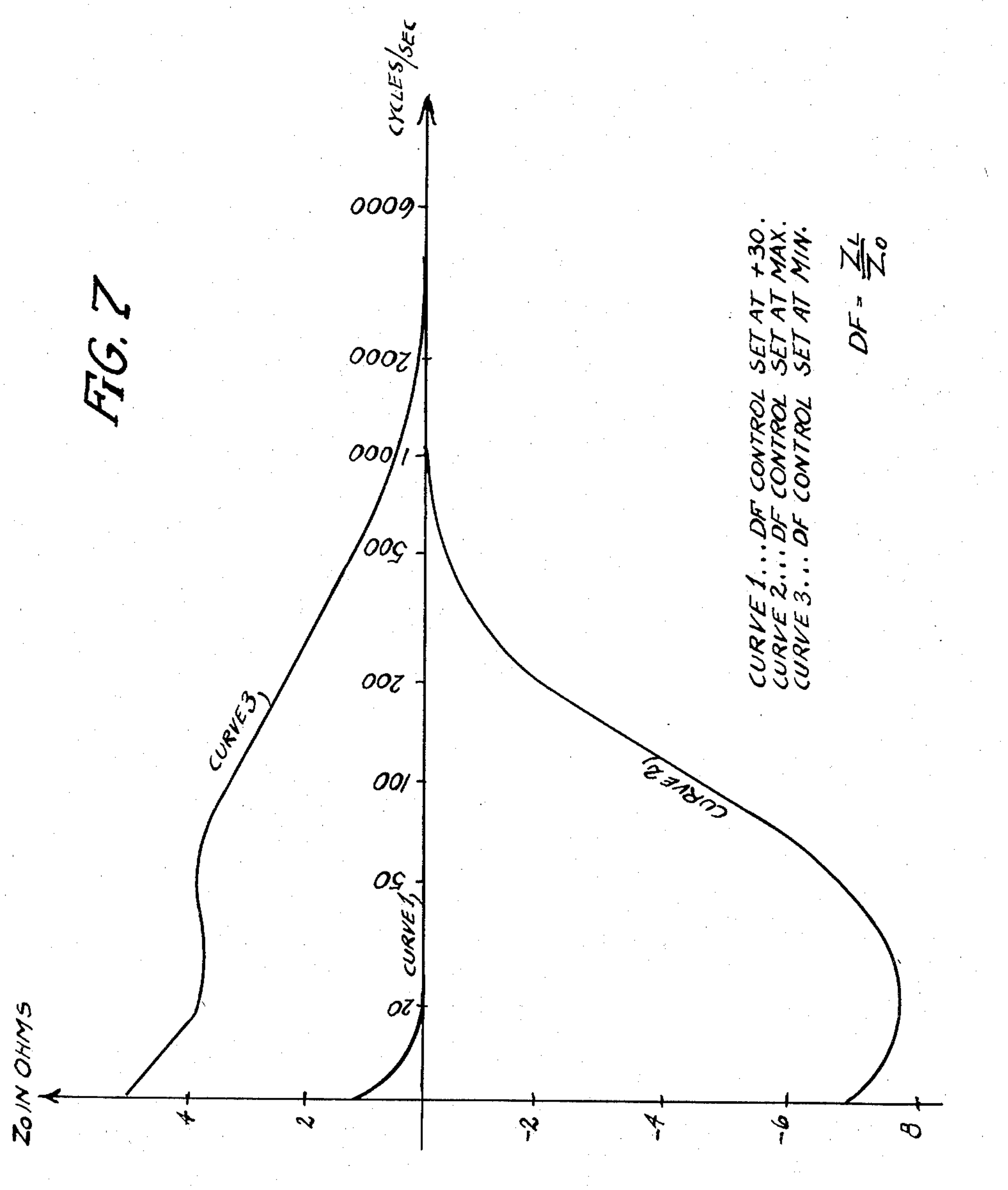
Fig. 7 shows typical frequency vs. impedance curves for the circuit of Fig. 6.

Fig. 7 illustrates typical amplifier output impedance vs. frequency characteristics of a practical embodiment of the invention such as shown in Fig. 6. Curve 1 shows the amplifier output impedance $Z_O$ as a function of frequency when the slider of control 18, Fig. 2, is set at the point between end positions 21, 22 that will produce no current feedback. The output impedance of the amplifier with the control set at this position represents the amplifier output impedance with negative voltage feedback only. The damping factor, DF, is determined by the following equation:

$$DF=\frac{Z_L}{Z_O}$$

wherein $Z_L$ is the load impedance.

Curve 2 shows the output impedance vs. frequency characteristic with the slider of control 18, Fig. 2, set at end position 22 which represents maximum positive current feedback for this particular embodiment of the invention.

Curve 3 shows the output impedance vs. frequency characteristic with the slider of control potentiometer 18, Fig. 2, set at end position 21 which represents maximum negative current feedback for this particular embodiment of the invention.

In accordance with the invention the following results or effects have been obtained among others: Since various types and makes of loudspeakers have different D. C. voice coil resistances, fundamental resonances, etc., and since various types and makes of loudspeaker enclosures have different resonant characteristics, etc., each different combination of loudspeaker and enclosure will require a different source impedance to feed it for optimum damping of the resonances of the combination. At optimum damping the effect of those resonances will be greatly decreased and will, therefore, impart less artificial coloration to the reproduced sound.

Since the current passing through the loudspeaker voice coil represents the motional impedance of the speaker, a voltage derived from this current will be a motional voltage. This motional voltage will include nonlinearities of the loudspeaker due to cone suspension and due to fringing of the magnetic field. When this motional voltage is properly utilized in a feedback loop in an amplifier a reduction of distortion generated by the loudspeaker results.

Another way of looking at the circuit discloses that since loudspeaker efficiency is directly proportional to gap flux density and inversely proportional to D. C. voice coil resistance, efficiency may be improved by either increasing gap flux density or decreasing D. C. voice coil resistance. If part of the D. C. voice coil resistance is canceled out by an amplifier having a negative output resistance, the net result will be an effective increase in loudspeaker efficiency.

The invention is not limited to the control elements shown and described nor to their particular arrangement in circuit but may be used in any form or manner and in any desired frequency range without departing from the scope of this disclosure.

We claim:

1. In an audio frequency amplification system having an input circuit, amplifying means, and an output transformer including a secondary winding, the combination of a secondary circuit including the voice coil of a speaker; a voltage-proportional negative feedback circuit; and a current-proportional feedback circuit in series relation with said voice coil across the terminals of said secondary winding, with a power lead extending from one terminal of the secondary winding to the voice coil and a return lead extending from the aforesaid current-proportional feedback circuit to the other terminal of the transformer secondary; said current-proportional feedback circuit including a Wheatstone bridge having one branch comprising of a pair of resistors in series and grounded at their junction, and the other branch comprising a potentiometer with a shiftable slider, movable from a positive feedback position through an intermediate zero feedback position to a negative feedback position; a low-pass audio frequency filter and a feedback lead extending from said slider through said filter and through the aforementioned voltage-proportional negative feedback circuit; said negative feedback circuit consisting of a pair of voltage divider resistors in series with each other and extending between the aforementioned power lead and the filter, with a feedback return line extending from the junction between said voltage-divider resistors to the amplifier.

2. In an audio frequency amplification system having an input circuit, amplifying means, and an output transformer including a secondary winding, the combination of a secondary circuit including the voice coil of a speaker; a voltage-proportional negative feedback circuit; and a current-proportional feedback circuit in series relation with said voice coil across the terminals of said secondary winding, with a power lead extending from one terminal of the secondary winding to the voice coil and a return lead extending from the aforesaid current-proportional feedback circuit to the other terminal of the transformer secondary; said current-proportional feedback circuit including a Wheatstone bridge having one branch comprising of a pair of resistors in series and grounded at their junction, and the other branch comprising a potentiometer with a shiftable slider, a low-pass audio frequency filter and a feedback lead extending from said slider through said filter and through the aforementioned voltage-proportional negative feedback circuit; said negative feedback circuit consisting of a pair of voltage divider resistors in series with each other and extending between the aforementioned power lead and the filter, with a feedback return line extending from the junction between said voltage-divider resistors to the amplifier.

References Cited in the file of this patent

UNITED STATES PATENTS

| | | |
|---|---|---|
| 2,101,525 | Bartels | Dec. 7, 1937 |
| 2,220,770 | Mayer | Nov. 5, 1940 |
| 2,236,690 | Mathes | Apr. 1, 1941 |
| 2,246,158 | Worcester | June 17, 1941 |
| 2,248,804 | Black et al. | July 8, 1941 |
| 2,282,382 | Root | May 12, 1942 |
| 2,282,383 | Root | May 12, 1942 |
| 2,367,110 | Fayer | Jan. 9, 1945 |
| 2,529,459 | Pourciau | Nov. 7, 1950 |
| 2,632,811 | Souget et al. | Mar. 24, 1953 |
| 2,652,458 | Miller | Sept. 15, 1953 |
| 2,672,781 | Miessner | Mar. 23, 1954 |

FOREIGN PATENTS

| | | |
|---|---|---|
| 484,423 | Great Britain | May 5, 1938 |